United States Patent
Wang

(10) Patent No.: US 7,606,584 B2
(45) Date of Patent: Oct. 20, 2009

(54) METHOD FOR PERFORMING SERVICES OF A MOBILE PHONE AND A MOBILE PHONE APPLYING THE METHOD

(75) Inventor: Zhengwei Wang, Shenzhen (CN)

(73) Assignee: Huawei Technologies Co., Limited, Shenzhen Guangdong (CN)

( * ) Notice: Subject to any disclaimer, the term of this patent is extended or adjusted under 35 U.S.C. 154(b) by 519 days.

(21) Appl. No.: 10/521,699

(22) PCT Filed: Jul. 17, 2003

(86) PCT No.: PCT/CN03/00569

§ 371 (c)(1),
(2), (4) Date: Jan. 19, 2005

(87) PCT Pub. No.: WO2004/010723

PCT Pub. Date: Jan. 29, 2004

(65) Prior Publication Data
US 2005/0255863 A1 Nov. 17, 2005

(30) Foreign Application Priority Data
Jul. 19, 2002 (CN) ............................. 02 1 25255

(51) Int. Cl.
*H04W 24/00* (2009.01)
(52) U.S. Cl. .............. 455/456.3; 455/456.1; 455/456.2; 455/456.5; 455/456.6; 455/457; 455/404.2; 455/41.2; 455/41.3; 370/338
(58) Field of Classification Search ............. 453/456.3, 453/436.1, 457, 414.3, 414.1; 340/990, 995.23, 340/993; 701/200, 207, 209; 455/41.2, 41.3, 455/456.1–457, 404.2; 370/338
See application file for complete search history.

(56) References Cited

U.S. PATENT DOCUMENTS 5,479,476 A * 12/1995 Finke-Anlauff ............. 455/566
5,903,833 A * 5/1999 Jonsson et al. ............. 455/417

(Continued)

FOREIGN PATENT DOCUMENTS

DE 198 16 859 A1 10/1999

(Continued)

OTHER PUBLICATIONS

International Search Report for PCT/CN03/00569, Nov. 6, 2003, 4 pages.

*Primary Examiner*—Stephen M D'Agosta
(74) *Attorney, Agent, or Firm*—Darby & Darby P.C.

(57) ABSTRACT

An embodiment of the present invention discloses a implementing method for intelligent services of the mobile telephone, and a mobile telephone for implementing the method, wherein adopting identification and recognition technology of physical objects, identifying the physical objects that will be expected identified by setting the identifier; setting a recognition element for recognizing the identifier in the mobile telephone; as a result, the mobile telephone can obtain the predetermined intelligent services to be triggered, and carry out the intelligent services according to the identified information stored in the identifier in conjunction with each of triggered records stored in the mobile telephone when the mobile telephone enters or leaves the identified cell of the identifier. An embodiment of the present invention can implement many intelligent services of the mobile telephone and has wider application range and field using the method above.

12 Claims, 1 Drawing Sheet

U.S. PATENT DOCUMENTS

| | | | |
|---|---|---|---|
| 5,926,760 A | 7/1999 | Khan et al. | |
| 5,929,848 A * | 7/1999 | Albukerk et al. | 715/700 |
| 6,233,448 B1 * | 5/2001 | Alperovich et al. | 455/417 |
| 6,389,288 B1 * | 5/2002 | Kuwahara et al. | 455/456.6 |
| 6,694,143 B1 * | 2/2004 | Beamish et al. | 455/456.1 |
| 6,823,257 B2 * | 11/2004 | Clapper | 701/207 |
| 6,867,733 B2 * | 3/2005 | Sandhu et al. | 342/357.07 |
| 6,937,869 B1 * | 8/2005 | Rayburn | 455/457 |
| 6,975,874 B1 * | 12/2005 | Bates et al. | 455/456.6 |
| 7,039,426 B2 * | 5/2006 | Naiki | 455/456.4 |
| 2001/0031640 A1 * | 10/2001 | Waller et al. | 455/456 |

FOREIGN PATENT DOCUMENTS

EP      0 905 990 A1      3/1999

\* cited by examiner

METHOD FOR PERFORMING SERVICES OF A MOBILE PHONE AND A MOBILE PHONE APPLYING THE METHOD

FIELD OF THE INVENTION

The present invention relates to mobile terminals in the field of communications, particularly to a method for performing services of a mobile phone and a mobile phone applying the method.

BACKGROUND OF THE INVENTION

The following situations often happen in true life of mobile phone users:

(1) Users are required to leave their mobile phones in sleep mode (that is to say, the mobile phones cannot receive or send any message and the current solution is to switch the phones off) when on a plane; and they need to awake their mobile phones when off the plane (the current solution is to switch the phones on).

(2) Users prefer to leave their mobile phones in sleep mode and have a secretary service handle calls when listening to an academic report; when the report is finished, they need to awake their mobile phones.

(3) Users like to inform their family when they arrive at or leave a hotel.

(4) Users like to transfer calls to family phones when at home or to office phones when in the office.

(5) Users set alarm clock at 7 A.M. to wake them up at home, and at 2 P.M. to wake them to resume work after having a nod in the office.

Nevertheless, how could a mobile phone distinguish these situations by itself, and then make corresponding responses at a user's wishes? For example, the mobile phone shuts down the RF module initiatively and remains in sleep mode when the user is on the plane, and opens the RF module and awakes itself when the user is off the plane.

SUMMARY OF THE INVENTION

The present invention is to provide a method for performing services of a mobile phone and a mobile phone applying the method. In one embodiment, the method performs more services of a mobile phone and is applied in wider fields and areas.

The present invention is to provide a method for performing services of a mobile phone comprising:

1. Setting a marker module, a wireless one, to mark preferable physical objects; both marking information of the marker module itself and that of the marked objects is stored in the marker module and transmitted by wireless.

Setting an identifier module, a wireless one, to receive the marking information transmitted from said marker module; said identifier module is set in the mobile phone in which stores preset trigger records;

2. Said mobile phone, via its identifier module, receives the marking information transmitted from said marker module, when detecting that it enters the marked area of the marker module, and then performs entry trigger service in preset trigger records.

3. Said mobile phone, if it detects that it stays in the marked area of the marker module, determines whether to perform stay trigger service in preset trigger records according to the present time.

4. Said mobile phone, if it detects that it exits the marked area of the marker module, determines to perform exit trigger service in preset trigger records.

Said stay trigger service may be repeat trigger service performed repeatedly at preset time intervals, or time trigger service performed at preset time.

In one embodiment, said preset trigger records comprise an entry trigger record, exit trigger record, repeat trigger record and time trigger record respectively corresponding to entry trigger service, exit trigger service, repeat trigger service and time trigger service.

In the method in accordance with one embodiment of the present invention, said area may be a single-marker area marked by a single identifier module, or a multi-marker union area or a multi-marker intersection area by plurality of marker modules.

In the method in accordance with one embodiment of the present invention, said services comprises call transfer, incoming call barring, short message service, sleep, awake, alarm clock setting, ring style setting or ring volume setting.

In the method in accordance with one embodiment of the present invention, after receiving the marking information transmitted from any marker module via its identifier module, if said mobile phone detects that the marker module is a new one, then it executes authentication on the new marker module; if the new marker module passes authentication, said mobile phone further determines whether to trigger corresponding service.

One aspect of the present invention is to provide a mobile phone applying the method. Said mobile phone has an identifier module, which comprises a receive module for receiving short-distance wireless message transmitted from external marker modules; said wireless receive module decodes out corresponding marking information from the wireless message, and then transmits the information to MPU in the mobile phone to process. Said identifier further comprises a transmit module for transmitting short-distance wireless message to the external marker modules.

In one embodiment, the present invention is through setting the marker module in which stores both marking information of itself and that of the marked objects and setting the identifier module, and through storing preset trigger records in the mobile phone, which has said identifier module. Then when the mobile phone enters the multi-marker union area of plurality of marker modules or the single-marker area of a single marker module, in accordance with the trigger records, the mobile phone determines and performs the entry trigger service. Thereafter, the mobile phone will perform certain service in accordance with different situations. The present invention has the following advantages:

1. Support to trigger call transfer service setting of a mobile phone.

2. Trigger all services provided by the mobile phone.

3. Offer users "a second-developing interface" to set services of the mobile phone. This is convenient and suitable for all kinds of users, such as setting call transfer and presetting some automatic short messages.

4. Have no effect on the communication network, thus it may be easily implemented with low cost.

It is obvious that the present invention can trigger more services of the mobile phone and has wider application fields and areas.

BRIEF DESCRIPTION OF THE DRAWINGS

The present invention will be understood more fully from the detailed description given below and from the accompanying drawings.

DETAILED DESCRIPTION OF THE PREFERRED EMBODIMENTS

Figure 1:
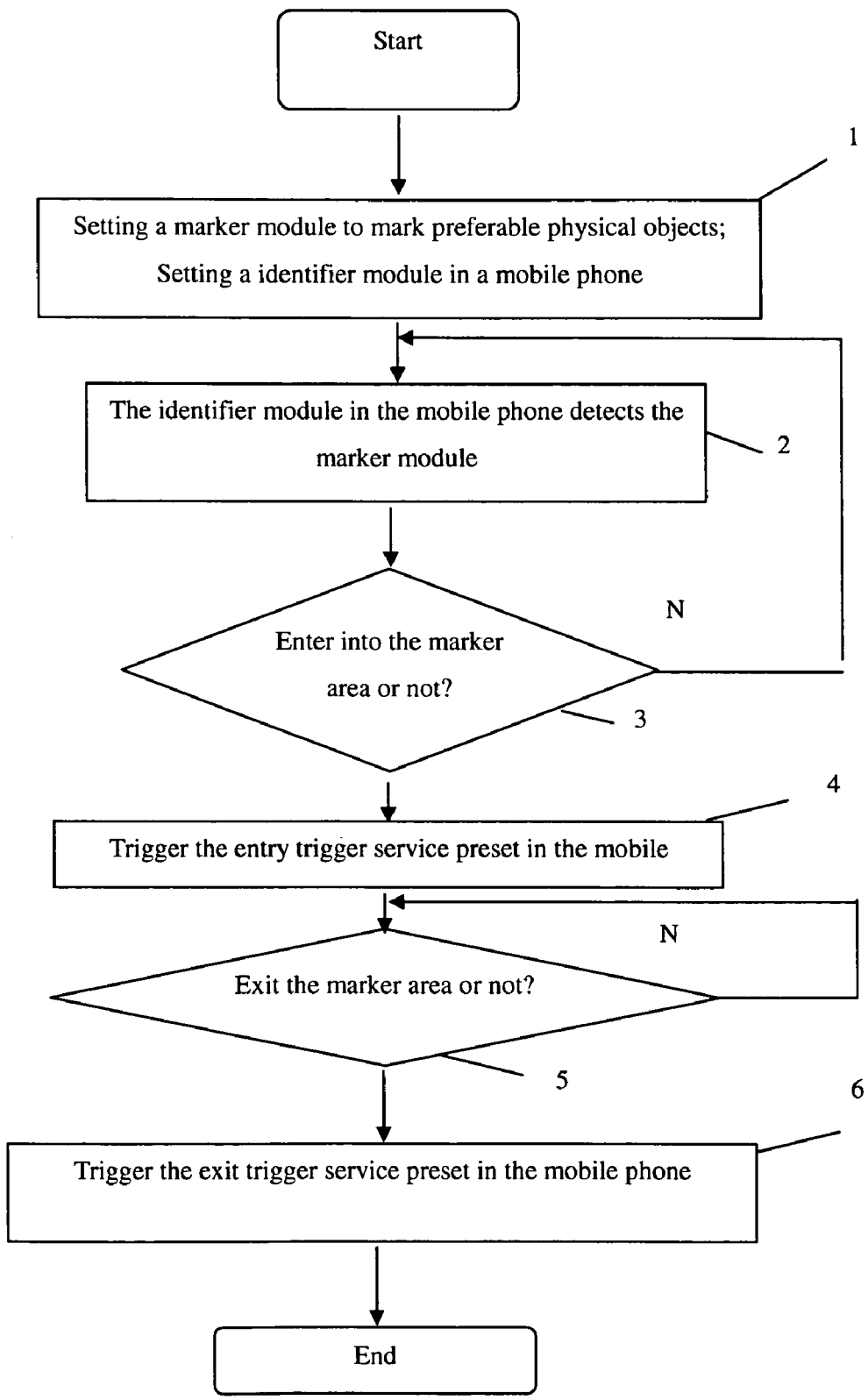
FIG. 1 is a flow diagram of one embodiment of a process for applying a method for performing services of a mobile phone.

A method provided according to the present invention can be applied to make a mobile phone trigger different services initiatively in accordance with different demands, such as automatically set or cancel call transfer, or set ring volume. Said method is through setting a marker module and an identifier module, and may be implemented by a mobile phone automatically without upgrading communication network. Meanwhile, services performed by the mobile phone provided by the present method may promote development of a communication network, for example, as for the "ONLY" service, right now when a mobile phone enters an office, it will trigger income call barring service, which avoids the mobile phone and the office phone sound bell at the same time.

FIG. 1 is a flow diagram of one embodiment of a process for applying a method for performing services of a mobile phone. Referring to FIG. 1, step 1 is to set a marker module and an identifier module. The marker module is wireless for marking preferable physical objects, and stores both marking information of itself and that of the marked objects. That is to say, a preset wireless marker module is used to mark preferable physical objects at a relevant site. In one embodiment, the marking information is listed as in the following table:

TABLE 1

Marking Information Stored in a Marker Module

| Elements | Length (BYTE) | Description |
|---|---|---|
| ESN | 8 | A HEX number of 4 bytes for expressing an ESN of a marker module. Not null. |
| GroupNo | 8 | Group number of marker modules may be input by users. For example, as to marking an anomalistic area in which plurality of telephones shares the same telephone number, then plurality of marker modules sharing the same group number should be used. Users may input a wildcard ESN and the group number to associate the telephone, reducing data requiring maintenance. Plurality of marker modules may be grouped for using as one marker module according to a group number. May be null. |
| ObjClass | 8 | Class of a marked object, such as class of a plane, train, hotel, library, home, office, classroom etc., may be unified worldwide. May be null. |
| ObjName | 32 | Name of a marked object, such as "my office", "my home" etc., may be set by users. May be null. |
| ObjNum | 4 | Number of a marked object, may be set by users. May be null. |
| X | 4 | Unit (mm), may be null |
| Y | 4 | Unit (mm), may be null |
| Z | 4 | Unit (mm), may be null |

Table 1 describes Electronics Serial Number (ESN) and Group Number (GroupNo) of the marker module, Object Count (ObjCount) of the marked object, Object Class (ObjClass), Object Number (ObjNum), Object Name (ObjName) of the marked object, and three-dimensional coordinate offsets, which stores in the marker module.

Said identifier module in the mobile phone is a wireless one for receiving wireless message transmitted from the marker module. The mobile phone stores an entry trigger record, exit trigger record, repeat trigger record and time trigger record preset by a user.

In one embodiment, the format of an entry trigger record is listed in Table 2.

TABLE 2

Entry trigger record

| Elements | Length (BYTE) | Description |
|---|---|---|
| ESN matching code | 8 | A HEX number of 4 bytes for wildcarding the ESN of some marker modules. |
| GroupNo | 8 | Group Number |
| ObjClass | | Class of a marked object |
| Object Names | 32 | Name of a marked object easy to memorize and manage, such as "my office", "my home", may be set by users or obtained from a marker module and modified by users if they like. |
| Services | char(128) | A command line, for example, CF 26540808 represents that 26540808 is a destination telephone number, and that setting call transfer. |
| TriggerMode | 1 | Single-marker area mode Multi-marker union area mode Default: TriggerMode = 1 |

In one embodiment, the format of an entry trigger record is listed in Table 3:

TABLE 3

Exit trigger record

| Elements | Length (BYTE) | Description |
|---|---|---|
| ESN matching code | 8 (temporary) | A HEX number of 4 bytes for wildcarding the ESN of some marker modules. |
| GroupNo | 8 | Group Number |
| ObjClass | | Class of a marked object |
| Object Names | 32 | Name of a marked object easy to memorize and manage, such as "my office", "my home", may be set by users or obtained from a marker module and modified by users if they like. |
| Services | char(128) | A command line, for example, NCF represents canceling call transfer service |
| TriggerMode | 1 | Single-marker area mode Multi-marker union area mode Default: TriggerMode = 1 |

In one embodiment, the format of a repeat trigger record is listed in Table 4:

TABLE 4

Repeat Trigger Record

| Elements | Length (BYTE) | Description |
|---|---|---|
| ESN matching code | 8 | A HEX number of 4 bytes for wildcarding the ESN of some marker modules. |

TABLE 4-continued

Repeat Trigger Record

| Elements | Length (BYTE) | Description |
|---|---|---|
| GroupNo | 8 | Group Number |
| ObjClass | | Class of a marked object |
| Object Names | 32 | Name of a marked object easy to memorize and manage, such as "my office", "my home", may be set by users or obtained from a marker module and modified by users if they like. |
| InterVal | 4 | Time interval to perform a service repeatedly when a mobile phone stays in an area |
| Service | char(128) | A command line, for example, "SendSM 'Mom, I am still in the library' to 13823766888" is a short message set by a primary student to set his mother's heart at rest. |

In one embodiment, the format of a time trigger record is listed in Table 5:

TABLE 5

Time trigger record

| Elements | Length (BYTE) | Description |
|---|---|---|
| ESN matching code | 8 | A HEX number of 4 bytes for wildcarding the ESN of some marker modules. |
| GroupNo | 8 | Group Number |
| ObjClass | | Class of a marked object |
| Object Names | 32 | Name of a marked object easy to memorize and manage, such as "my office", "my home", may be set by users or obtained from a marker module and modified by users if they like. |
| Services | char(128) | A command line, for example, Play Clock Ring represents sounding alarm clock bell. |
| TriggerTime | 8 | Time to perform a service when a mobile phone stays in an area |

Referring to Tables 2 to 5, each record comprises Electronics Serial Number (ESN) and Group Number (GroupNo) of a marker module, Object Class (ObjClass) of a marked object. These three fields form a "marker module-trigger records" matching key field, in short a matching key field. A mobile phone, via the marking information of a marker module, is to match each matching key field in these trigger records lists, and choose services to be triggered to perform.

In the above-described trigger records lists:

1. ESN matching code may use wildcards such as "?", "*", wherein, "*" represents matching any substring in ESN, and "?" represents matching any char in ESN. For example, 123?56780000000000 match 10 numbers from 123056780000000000 to 123956780000000000.

2. GroupNo is used to associate plurality of marker modules, for example, a multi-marker area is marked by plurality of marker modules sharing the same group number.

3. ObjClass represents class of a marked object, such as area class comprising a region (Asia, Africa or Europe etc.) code, national code, local code etc,; transportation class comprising a plane, train, steamboat, yacht; construction class comprising an academic report hall, meeting room, office, home, classroom, library, church and hotel; pleasure ground class comprising a park, zoo and seashore; places of interests class comprising a monastery, Taoist temple, crest of Mount Tai and Shaolin temple etc.

5. InterVal represents a time interval to perform a service repeatedly when a mobile phone stays in an area.

6. Services represents various services of a mobile phone, comprising call transfer, incoming call barring, short message service, sleep, awake, alarm clock setting, ring style setting or ring volume setting.

7. TriggerTime represents the time to perform a service when a mobile phone stays in an area.

8. TriggerMode represents a trigger mode that may be a single-marker area mode or multi-marker union area mode.

(1) As for any exit trigger record:

When TriggerMode=0, as for any marker module matching the trigger record, the mobile phone first receives the marking information transmitted from the marker module, detecting that it enters the single-marker area marked by the marker module, and then performs the corresponding entry trigger service.

When TriggerMode=1, as for all marker modules matching the trigger record, the mobile phone first receives the marking information transmitted from any marker module of said all marker modules, detecting that it enters the multi-marker union area marked by said all marker modules, and then performs the corresponding entry trigger service. For example, when entering a multi-marker union area matching the matching key field, a mobile phone first receives the marking information transmitted from a first marker module A, and performs the corresponding entry trigger service. Thereafter, if the mobile phone stays in the area and then receives the marking information transmitted from a second marker module B, it will not perform the entry trigger service again.

(2) As for any exit trigger record:

When TriggerMode=0, as for any marker module matching the trigger record, after a mobile phone enters a single-marker area marked by the marker module, if it doesn't receive the marking information transmitted from the marker module during preset time period, the mobile phone determines that it exits the single-marker area, and then performs the corresponding exit trigger service.

When TriggerMode=1, as for all marker modules matching the trigger record, after a mobile phone enters a multi-marker union area marked by said all marker modules, if it doesn't receive the marking information transmitted from any marker module of said all marker modules during preset time period, the mobile phone determines that it exits the multi-marker area, and then performs the corresponding exit trigger service. Only if the mobile phone exits the multi-marker union area (that is to say it couldn't receive wireless message of any marker module matching the matching key field of the record), it performs the exit trigger service. Namely, if the mobile phone stays in the multi-marker union area, it will not perform the exit trigger service every time when exiting the marked area of certain marker module.

(3) As for any stay trigger record:

Take a multi-marker union area for example. When the mobile phone works in the multi-marker union area mode, as for all marker module matching the trigger record, after a mobile phone enters a multi-marker union area marked by said all marker modules, if it receives the marking information transmitted from any marker module of said all marker modules during preset time period, the mobile phone then determines that it stays in the multi-marker union area; as for repeat trigger service, if it stays in the multi-marker union area, the mobile phone performs repeatedly the repeat trigger service at preset time intervals; As for time trigger service, if it stays in the multi-marker union area, the mobile phone performs the time trigger service at preset time. For example, the time trigger service may be setting the alarm clock at 7 A.M. to wake a user up at home marked by the home marker module, and at 2 P.M. to wake him to resume work after having a nod in the office marked by the office marker module.

Even if matching key field of a trigger record just matches a marker module under all circumstances, it may be still to set trigger mode of the record to be the multi-marker union area mode. Then the two trigger modes are the same.

For example, there are three marker modules respectively set on a Boeing 777, respectively at positions of its front, middle and back. Since passengers don't know how many marker modules on the Boeing 777 and their marking information but they do know ObjClass of the marked object is Boeing 777, they may set their mobile phones as follows:

The entry trigger record when a user's boarding on the plane: (ESN matching code=*, GroupNo=NULL, ObjClass=plane class, ObjName="plane", service=send short messages to family +switch off, TriggerMode=1);

The exit trigger record when off the plane: (ESN matching code=*, GroupNo=NULL, ObjClass=plane class, ObjName="plane", service=switch on+send short messages to family+, TriggerMode=1);

When a passenger is on the plane, his mobile phone first receives the marking information transmitted from a front marker module A, and performs "send short messages to family+switch off" service. Then the mobile phone leaves the marked area of a marker module A, enters the marked area of a marker module B, and then exits the area and finally enters the marked area of a marker module C at the back. In this whole process, the mobile phone remains in sleep status and will not perform "switch on+send short messages to family" when exits the marked area of the marker module A or B, nor perform "send short messages to family+switch off" service again when enters the marked area of the marker module B or C.

Also, when the passenger walks from the back, passes the middle, and exits the plane through the front door (suppose that he boarded on the plane through the same door), only if his mobile phone exits the multi-marker union area of three marker modules A, B, and C, namely the mobile phone cannot receive any message from these three marker modules, it will perform "switch on+send short messages to family". The trigger records will be effective when the passenger takes any Boeing 777 plane.

Referring to FIG. 1, based on step 1, an identifier module in a mobile phone searches for a marker module in step 2, if the mobile phone enters the effective signal area of the marker module, it will receive the broadcast message from the marker module.

No matter when receiving broadcast messages from a marker module, a mobile phone will analyze and handle this marker information. The process is checking whether the marker module is in the marker module list in accordance with its marking information. If it exists, that means the marker module is not a new one, and then the mobile phone updates the time when receiving the last message from the marker module.

If the marker module is not in the list, which means it is a new one. Then the mobile phone adds the marker module to the list, and searches for an entry trigger record matching it in the entry trigger record list. If no entry trigger record matches the marker module, the mobile phone will not perform any entry trigger service. If some entry trigger records do match the marker module, then as for each one, the mobile phone determines whether it just enters the marked area in step 3, which is different if the trigger mode is different. If the trigger mode is single-marker area mode, that is TriggerMode=0, the mobile phone will perform the entry trigger service directly in step 4. If the trigger mode is multi-marker union area mode, that is TriggerMode=1, the mobile phone determines whether it just enters the multi-marker union area marked by the marker module matching the matching key field of the trigger record, if so, it performs the entry trigger service directly in step 4, if not, it won't perform.

When a mobile phone has detected a new marker module, it uses the marker module to activate its stored relevant stay trigger record list. Namely, the mobile phone searches the repeat trigger record list and the time trigger record list for the stay trigger record matching the marker module, such as the repeat trigger record and time trigger record, and then activates these stay trigger records.

After step 4, the identifier module in the mobile phone handshakes with the marker modules in current marker module list, or the identifier module in the mobile phone is still detecting wireless message from the marker module in current marker module list to determine whether the mobile phone exits the marker area of a marker module (which may be achieved through whether the mobile phone can detect messages from the marker module during certain time interval. These messages may be various response messages including handshake message returned by the marker module and its broadcast message). If it exits, the mobile phone first deletes the marker module in the current marker module list. And then the mobile phone searches the exit trigger record list for the exit trigger record matching the marker module. If no exit trigger record matches the marker module, the mobile phone will not perform any exit trigger service.

If some exit trigger records do match the marker module, then as for each one, the mobile phone determines whether it just exits the marked area in step 5, which is different if the trigger mode is different. If the trigger mode is single-marker area mode, that is TriggerMode=0, the mobile phone will perform exit trigger service directly in step 6. If the trigger mode is multi-marker union area mode, that is TriggerMode=1, the mobile phone determines whether it already exits the multi-marker union area marked by the marker module matching the matching key field of the trigger record, if so, it performs the exit trigger service directly in step 6, if not, it won't perform. Take the multi-marker union area for an example. When it determines that it exits the marked area of a marker module, the mobile phone will search for every above-mentioned activated stay trigger records. As for these records, the mobile phone first deactivates and then handles them in this process: making the stay trigger records to match each marker module in the current marker module list; if a record does match certain marker module, which means the mobile phone hasn't exited the marked area marked by the marker module matching the record, thus the mobile phone has to reactivate this stay trigger record just deactivated.

In one embodiment, the mobile phone checks the current marker module list periodically. As for each marker module, the mobile phone compares current time with the time when receiving last message from the marker module. If the time gap exceeds preset time value, the mobile phone determines that it exits the marked area of the marker module.

As for the activated repeat trigger record, the mobile phone performs the repeat trigger service once at time intervals (InterVal shall be greater than 0, otherwise, it is invalid).

As for the activated time trigger record, the mobile phone performs the time trigger service once at preset time.

The mobile phone searches for the marker module in a polling mode. If detecting a marker module, the mobile phone associates with it and receives its marking information, and then performs above-described relevant handling process. After association, the mobile phone remains handshaking with the marker module. If handshaking failure amounts to certain times or awaiting handshaking response frame overtimes, which means the mobile phone already exits the coverage of communication association (for example, communication distance of blue tooth is defined as 5 meters), communication will naturally interrupted (in broadcast mode, communication interruption is determined by whether detecting broadcast message from the marker module overtimes or not).

In above-described process, if no entry trigger record, exit trigger record, repeat trigger record or time trigger record are set aim to a marker module, the marker module is an irrelevant one to a mobile phone. Correspondingly, as for a marker module aim to which one of these four trigger service is set, the marker module is a relevant one to a mobile phone. The mobile phone may classify newly detected marker modules into irrelevant ones and relevant ones, as shown in Table 6:

TABLE 6

Relevant Marker Module List

| Elements | Length (BYTE) | Description |
|---|---|---|
| ESN | 8 | A HEX number of 4 bytes for expressing an ESN of a marker module. |
| Entry trigger record or not | 1 | 0: No, 1: Yes |
| Exit trigger record or not | 1 | 0: No, 1: Yes |
| Repeat trigger record or not | 1 | 0: No, 1: Yes |
| Time trigger record or not | 1 | 0: No, 1: Yes |

In above table, at least one of the entry trigger record, exit trigger record, repeat trigger record and time trigger record is set to "1", otherwise, the maker module is an irrelevant one.

Referring to FIG. 1, in one embodiment, trigger records in a mobile phone may be set to provide the following functions to promote users' convenience:

1) Add a trigger record;
2) Delete a trigger record;
3) Modify a trigger record;
4) Empty trigger record list;
5) Search trigger record list;
6) Set trigger switch list;
7) Obtain marking information list of all marker modules in current area; the list should contain "A new marker module or not" flag. If flag=0, the marker module is new. If flag=1, the marker module already exists in the relevant marker module list or irrelevant marker module list;
8) Add relevant marking information of a new marker module into the trigger records list of the mobile phone to add a trigger record.

Since it may be difficult to input matching key field information (ESN, GroupNo, ObjClass) of trigger records, function 7 and 8 may relieve users of inputting whole matching key field information. Namely, users may set trigger records by modifying available marking information appropriately.

The mobile phone may be set some trigger switches as shown in Table 7:

TABLE 7

Trigger Switch list Format

| Elements | Length (BYTE) | Description |
|---|---|---|
| Entry trigger switch | 1 | 0: Off; 1: On |
| Exit trigger switch | 1 | 0: Off; 1: On |
| Stay trigger switch | 1 | 0: Off; 1: On |
| Automatic call transfer switch | 1 | 0: Off; 1: On |
| Automatic short message service switch | 1 | 0: Off; 1: On |
| Automatic sleep/wake switch | 1 | 0: Off; 1: On |

In one embodiment, according to functions listed in above table, if entry trigger switch is set as "0", the mobile phone doesn't perform any entry trigger service; if exit trigger switch is set as "0", the mobile phone doesn't perform any exit trigger service. The other items are all similar.

The above-described single-marker area is the effective signal area of a marker module, in which the mobile phone can receive the marking information transmitted from the marker module. The above-described multi-marker union area is the effective signal area of plurality of marker modules meeting certain conditions, in which the mobile phone at least can receive the marking information transmitted from certain marker module meeting said conditions.

One embodiment of the present invention may be used in the fields of tracking information of working employees in a supermarket, tracking location of climbers or explorers (when in danger, climbers normally are unable to send short messages to the base in time, thus it is necessary to preset short message records), monitoring sport route in Marathon, tracking children or people on business trip to set their family at ease etc.

One method of the present invention can be applied to perform the following functions. For example, in trigger records list set by users and stored in the mobile phone, a trigger record may include trigger-permission time limit or trigger-prohibition time limit. If a trigger record set by users includes trigger-permission time limit for triggering certain service, when performing the entry trigger service, exit trigger service or stay trigger service, the mobile phone determines whether the time is in the trigger-permission time limit, if so, it performs corresponding services, otherwise, it doesn't perform corresponding services. If a trigger record set by users includes trigger-prohibition time limit for triggering certain service; when performing the entry trigger service, exit trigger service or stay trigger service, the mobile phone determines whether the time is in the trigger-prohibition time limit, if so, it doesn't perform corresponding services, otherwise, it performs corresponding services.

The mobile phone may execute authentication on a sensitive marker module in order to avoid hoaxes. For example, a user stores his ID (namely ESN of a mobile phone) and KEY (suppose KEY=35768) in the "corresponding relationship of a mobile phone-KEY (security key)" list in the home marker module in advance. Meanwhile, the user stores this KEY (suppose KEY=357468) and corresponding marker module ID (namely ESN of a marker module) in "corresponding relationship of a marker module-Key (security key)" list in his mobile phones. So when the arrives home, his mobile phone can receive messages from the home marker module, and determines that it may be the home marker module in accordance with ESN of the marker module. The mobile phone generates a random number, and sends the random number together with its ID information to the marker module. And the marker module, based on received ESN of the mobile phone, searches its stored "corresponding relationship of a mobile phone-KEY" list for KEY of the mobile phone. And then the marker module performs the encryption operation (since encryption operation is a disclosed technology, the present invention will not elaborate it especially) on the random number and KEY of the mobile phone, and sends the result back to the mobile phone. The mobile phone then performs encryption operation on the random number and its stored KEY of the marker module in the "corresponding relationship of a marker module-Key" list. Thereafter, the mobile phone compares its result with received result sent by the marker module, if the two are consistent, and then determines the marker module is the home marker module. If not, the mobile phone determines the marker module is not the home marker module and blacklists it. In practical life, there are various other authentication processes and methods, which will not be elaborated here.

As for different marker modules, a user may set different KEYs in them. A user may also use a unified KEY to set all sensitive marker modules to promote his convenience. Then the mobile phone is unnecessary to set "corresponding relationship of a marker module-Key (security key)" list, but only to set a sensitive marker module list and a public KEY.

It may be to set a sensitive marker module list in a mobile phone to indicate what marker modules the mobile phone shall execute authentication on. For example, if a user regard the home marker module and the office marker module that are two his sensitive marker modules being in common use, they may add the two marker modules into the sensitive marker module list. Meanwhile, users store KEY corresponding to each maker module and ESN of his mobile phone into the home marker module and the office marker module.

As for a sensitive marker module, only if one that passes authentication, the mobile phone will perform corresponding trigger services. Moreover, when staying in an area, the mobile phone may execute authentication periodically to prevent attacks from illegal persons.

In addition, Object classes in a marker module may include multiple objects class (MultiObj); that is to say, a marker module marks plurality of objects in its marked area, for example, a market, coffee house or meeting room in the same building. Here the marking information comprises Electronics Serial Number (ESN) and Group Number (GroupNo) of the marker module, Object Count (ObjCount) of the marked objects, Object List comprising Object Class (ObjClass), Object Number (ObjNum), Object Name (ObjName) of the marked objects, and three-dimensional coordinate offsets. The mobile phone can search the object list for information of the object being used.

In practical life, it may be to set the multi-marker intersection area mode, which means the intersection area of the marked areas of plurality of marker modules meeting certain conditions. In this area, the mobile phone can receive marking information of all marker modules meeting said conditions. It is meaningful to use a plurality of marker modules to locate much more precisely. A group of marker modules are set to trigger certain service. In this circumstance, only if the mobile phone detects marking information transmitted for all marker modules, it will perform entry or stay trigger service. When exiting the marked area of any marker module, the mobile phone will perform exit trigger service. In the multi-marker intersection area mode, these marker modules shall be fixed, and only ESN matching code in matching key field in trigger records is meaningful. And number of marker modules that the ESN matching code matches shall be less enough that the mobile phone can receive marking information transmitted from all marker modules during certain time period. If the mobile phone works in multi-marker intersection area mode, trigger records may be an ESN list made up by ESN of plurality of marker modules, including services information etc. Only when receiving marking information transmitted from all marker modules, the mobile phone determines whether to perform the corresponding service or not. As for each trigger record, the mobile phone may work in multi-marker intersection area mode. When the mobile phone works in the multi-marker intersection area mode, a trigger record may comprise a marking information list formed by the marking information of the plurality of marker modules, and said marking information list may comprise the Electronics Serial Numbers (ESN) of the plurality of marker modules.

Moreover, environmental parameters detected and transmitted by a marker module may be part of the marking information, for example, the temperature, humidity, pollution index, or noise. The mobile phone may perform corresponding service based on received environmental parameters. For example, when detecting that environmental noise is too loud, the mobile phone raises ring volume appropriately.

When a marker module is designed to work normally, that is to say, the marker module broadcasts its essential marking information periodically. After it receives the essential marking information, the mobile phone will initiatively send a request to the marker module which transmits corresponding detailed marking information based on the received request. For example, the essential marking information is the Electronics Serial Number (ESN), while the detailed marking information comprises the marking information of the marker module itself and that of the marked objects which may be object class or environmental parameters etc. The essential marking information may also be the communication address of the marker module, which may be static allocated address or a dynamic allocated address.

What is claimed is:

1. A method for performing services by a mobile phone, the method comprising:

providing a wireless blue tooth identifier module in the mobile phone, wherein said identifier module can receive a short-distance wireless message transmitted by a blue tooth marker module set for a physical object to be marked, said marker module storing marking information of both said marker module itself and the marked object;

storing preset entry trigger records in the mobile phone, wherein said entry trigger records comprise a corresponding relationship between a predefined marking information and a predefined entry trigger service;

retrieving corresponding marking information from the short-distance wireless message received from any one marker module by said identifier module; and performing the corresponding entry trigger service when the mobile phone determines based on the retrieved marking information that the mobile phone has entered an area marked by said marker module and an entry trigger service corresponding to the retrieved marking information is contained in said entry trigger records;

wherein said area may be a single-marker area marked by a single marker module, or a multi-marker union area or a multi-marker intersection area marked by a plurality of marker modules;

wherein, as for any one of the entry trigger records, said mobile phone may work in the single-marker area mode or in the multi-marker union area mode;

wherein in the single-marker area mode, as for any marker module matching the trigger record, the first time the mobile phone receives the marking information transmitted from the marker module, it determines that it has entered the single-marker area, and then performs a corresponding entry trigger service; and wherein in the multi-marker union area mode, as for all marker modules matching the trigger record, the first time the mobile phone receives the marking information transmitted from any one of the marker modules, it determines that it has entered the multi-marker union area, and then performs the corresponding entry trigger service.

2. The method according to claim 1 wherein, as for any stay trigger record, said mobile phone may work in the single-marker area mode or multi-marker union area mode;

when said mobile phone works in the multi-marker union area mode, as for all marker modules matching the trigger record, if said mobile phone receives the marking information transmitted from any marker module during a preset time period, the mobile phone then determines that it has remained in the multi-marker union area;

as for repeat trigger service, if said mobile phone remains in the multi-marker union area, the mobile phone performs repeatedly the repeat trigger service at preset time intervals;

as for time trigger service, if said mobile phone remains in the multi-marker union area, the mobile phone performs the time trigger service at a preset time.

3. The method according to claim 1, wherein, for every trigger record, said mobile phone may work in the multi-marker intersection area mode; and when the mobile phone works in the multi-marker intersection area mode, said trigger records at least comprise a marking information list formed by the marking information of the plurality of marker modules, and said marking information list at least comprises the Electronics Serial Numbers (ESN) of the plurality of marker modules.

4. The method according to claim 1, wherein, as for any one of the exit trigger records, said mobile phone may work in the single-marker area mode or in the multi-marker union area mode;

wherein in the single-marker area mode, as for any marker module matching the trigger record, after the mobile phone enters the single-marker area, if it doesn't receive the marking information transmitted from the marker module during a preset time period, the mobile phone determines that it has exited the single-marker area, and then performs a corresponding exit trigger service;

wherein in the multi-marker union area mode, as for all marker modules matching the trigger record, after the mobile phone enters the multi-marker union area if it doesn't receive the marking information transmitted from any one of the marker modules during a preset time period, the mobile phone determines that it has exited the multi-marker area, and then performs the corresponding exit trigger service.

5. A method for performing services by a mobile phone, the method comprising:

providing a wireless blue tooth identifier module in the mobile phone, wherein said identifier module can receive a short-distance wireless message transmitted by a blue tooth marker module set for a physical object to be marked, said marker module storing marking information of both said marker module itself and the marked object;

storing preset entry trigger records in the mobile phone, wherein said entry trigger records comprise a corresponding relationship between a predefined marking information and a predefined entry trigger service;

retrieving corresponding marking information from the short-distance wireless message received from any one marker module by said identifier module; and performing the corresponding entry trigger service when the mobile phone determines based on the retrieved marking information that the mobile phone has entered an area marked by said marker module and an entry trigger service corresponding to the retrieved marking information is contained in said entry trigger records;

wherein said area may be a single-marker area marked by a single marker module, or a multi-marker union area or a multi-marker intersection area marked by a plurality of marker modules;

wherein said marking information comprises Electronics Serial Number (ESN) and Group Number (GroupNo) of the marker module, Object Class (ObjClass), Object Number (ObjNum) and Object Name (ObjName) of the marked object, and three-dimensional coordinate offsets from the market module to the marked object.

6. The method according to claim 5, wherein, said entry trigger record comprises Electronics Serial Number (ESN) matching code and Group Number (GroupNo) of the marker module, Object Class (ObjClass) of the marked object, trigger services and trigger mode (TriggerMode);

said exit trigger record comprises Electronics Serial Number (ESN) matching code and Group Number (GroupNo) of the marker module, Object Class (ObjClass) of the marked object, trigger services and trigger mode (TriggerMode);

said repeat trigger record comprises Electronics Serial Number (ESN) matching code and Group Number (GroupNo) of the marker module, Object Class (ObjClass) of the marked object, time interval (Interval) and trigger services; and said time trigger record comprises Electronics Serial Number (ESN) matching code and Group Number (GroupNo) of the marker module, Object Class (ObjClass) of the marked object, trigger services and trigger time.

7. The method according to claim 6, wherein said trigger records comprise a trigger-permission time limit for triggering a certain service; when performing the entry trigger service, exit trigger service or stay trigger service, the mobile phone determines whether the present time is in the trigger-permission time limit and if so, it performs the corresponding service, and otherwise, it doesn't perform.

8. The method according to claim 7, wherein said trigger records further comprises a trigger-prohibition time limit for triggering certain service; when performing the entry trigger service, exit trigger service or stay trigger service, the mobile phone determining whether the present time is in the trigger-forbidden time limit and if so, it doesn't perform the corresponding service, otherwise, performing the service.

9. A method for performing services by a mobile phone, the method comprising:

providing a wireless blue tooth identifier module in the mobile phone, wherein said identifier module can receive a short-distance wireless message transmitted by a blue tooth marker module set for a physical object to be marked, said marker module storing marking information of both said marker module itself and the marked object;

storing preset entry trigger records in the mobile phone, wherein said entry trigger records comprise a corresponding relationship between a predefined marking information and a predefined entry trigger service;

retrieving corresponding marking information from the short-distance wireless message received from any one marker module by said identifier module; and performing the corresponding entry trigger service when the mobile phone determines based on the retrieved marking information that the mobile phone has entered an area marked by said marker module and an entry trigger service corresponding to the retrieved marking information is contained in said entry trigger records;

wherein, after receiving the marking information transmitted from any marker module via its identifier module, if said mobile phone detects that the marker module is a new one, then executing authentication on the new marker module; if the new marker module passes authentication, the mobile phone further determining whether to trigger corresponding service, otherwise, deeming the marker module is invalid;

wherein said authentication comprises:

in accordance with the marking information of a newly detected marker module received by its identifier module, sending by the mobile phone of its ID information and a random number to the marker module and generating a first encryption number based on said random number and its stored security key;

based on received ID information of the mobile phone, the marker module searching for a corresponding security key; if successful, generating a second encryption number based on the security key and the random number and transmitting it to said mobile phone;

the mobile phone comparing the first encryption number with received second encryption number, and if the two are consistent, and then determining that the marker module passes authentication.

10. A method for performing services by a mobile phone, the method comprising:

providing a wireless blue tooth identifier module in the mobile phone, wherein said identifier module can receive a short-distance wireless message transmitted by a blue tooth marker module set for a physical object to be marked, said marker module storing marking information of both said marker module itself and the marked object;

storing preset entry trigger records in the mobile phone, wherein said entry trigger records comprise a corresponding relationship between a predefined marking information and a predefined entry trigger service;

retrieving corresponding marking information from the short-distance wireless message received from any one marker module by said identifier module; and performing the corresponding entry trigger service when the mobile phone determines based on the retrieved marking information that the mobile phone has entered an area marked by said marker module and an entry trigger service corresponding to the retrieved marking information is contained in said entry trigger records;

wherein said marking information comprises Electronics Serial Number (ESN) and Group Number (GroupNo) of the marker module, Object Count (ObjCount) of the marked objects, list comprising Object Class (ObjClass), Object Number (ObjNum), Object Name (ObjName) of the marked objects, and three-dimensional coordinate offsets.

11. The method according to claim 10 wherein said marker module further comprises an environment-monitoring module for monitoring environmental parameters; said marking information further comprises the environmental parameters detected by the marker module;

wherein said environment-monitoring module can monitor one or many of the environmental temperature, humidity, pollution index, or noise; said environmental parameters may be one or many of the temperature, humidity, pollution index, or noise.

12. A method for performing services by a mobile phone, the method comprising:

providing a wireless blue tooth identifier module in the mobile phone, wherein said identifier module can receive a short-distance wireless message transmitted by a blue tooth marker module set for a physical object to be marked, said marker module storing marking information of both said marker module itself and the marked object;

storing preset entry trigger records in the mobile phone, wherein said entry trigger records comprise a corresponding relationship between a predefined marking information and a predefined entry trigger service;

retrieving corresponding marking information from the short-distance wireless message received from any one marker module by said identifier module; and performing the corresponding entry trigger service when the mobile phone determines based on the retrieved marking information that the mobile phone has entered an area marked by said marker module and an entry trigger service corresponding to the retrieved marking information is contained in said entry trigger records;

wherein said marker module broadcasts its essential marking information at preset time intervals, said mobile phone receiving said essential marking information and then sending back a request, said mobile phone then receiving a transmission from said marker module with corresponding detailed marking information based on the sent request;

wherein said essential marking information is the Electronics Serial Number (ESN) of the marker module, and said detailed marking information comprises the marking information of the marker module itself and that of the marked objects.

* * * * *